Oct. 6, 1931.  A. V. PICKERING ET AL  1,826,188
JIG SAW
Filed May 31, 1930    4 Sheets-Sheet 1

Inventors.
Albert V. Pickering
Albert H. Moore

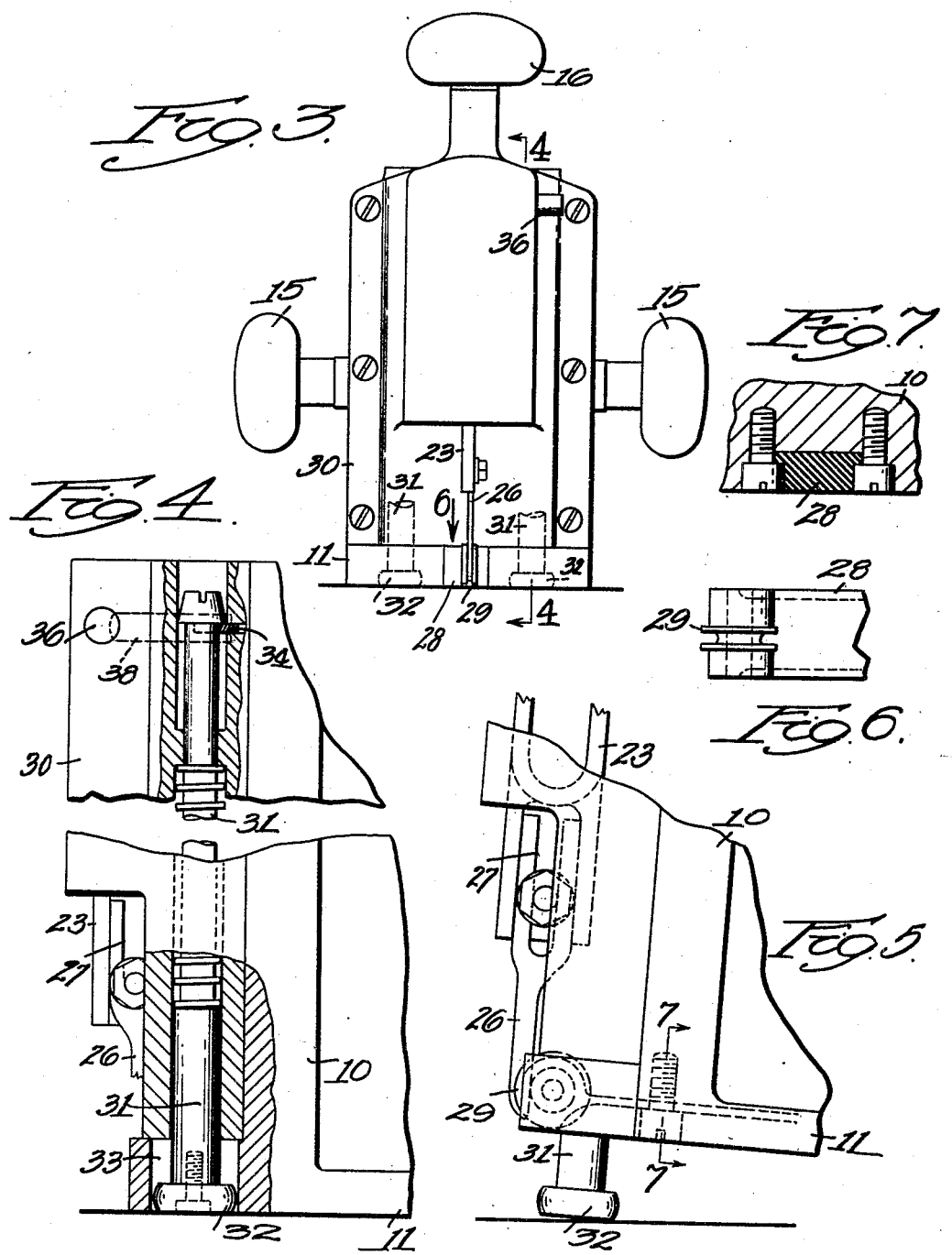

Oct. 6, 1931.  A. V. PICKERING ET AL  1,826,188
JIG SAW
Filed May 31, 1930  4 Sheets-Sheet 3
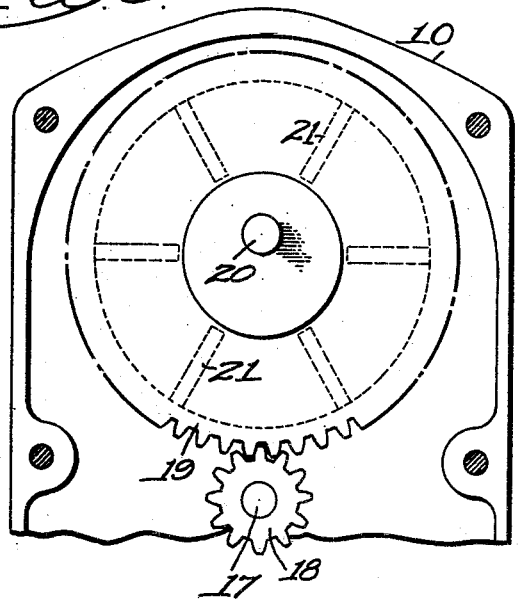
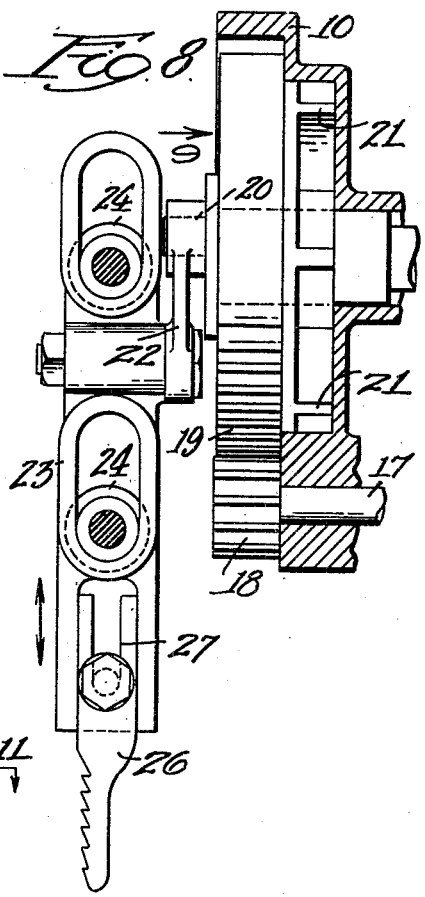
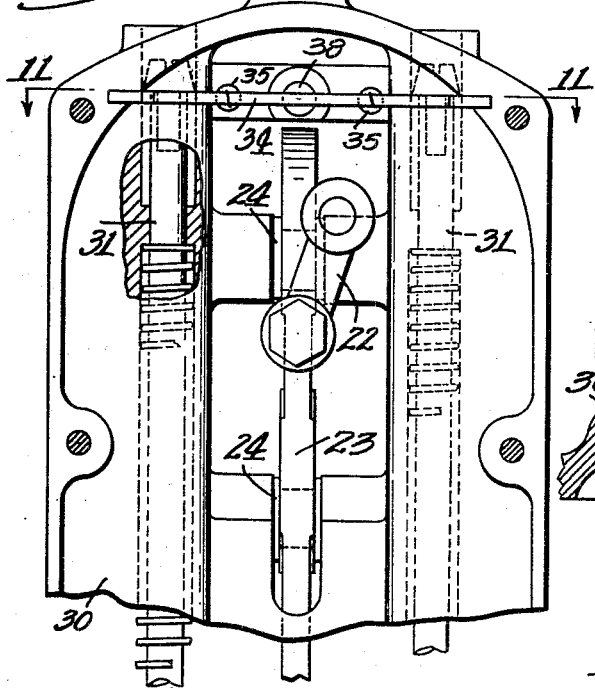
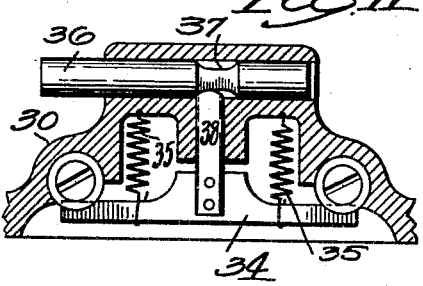

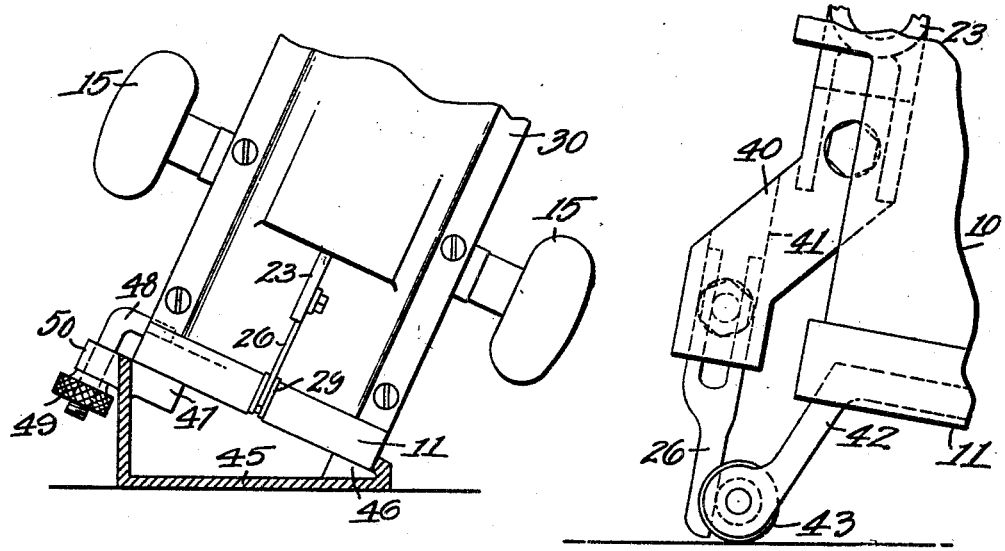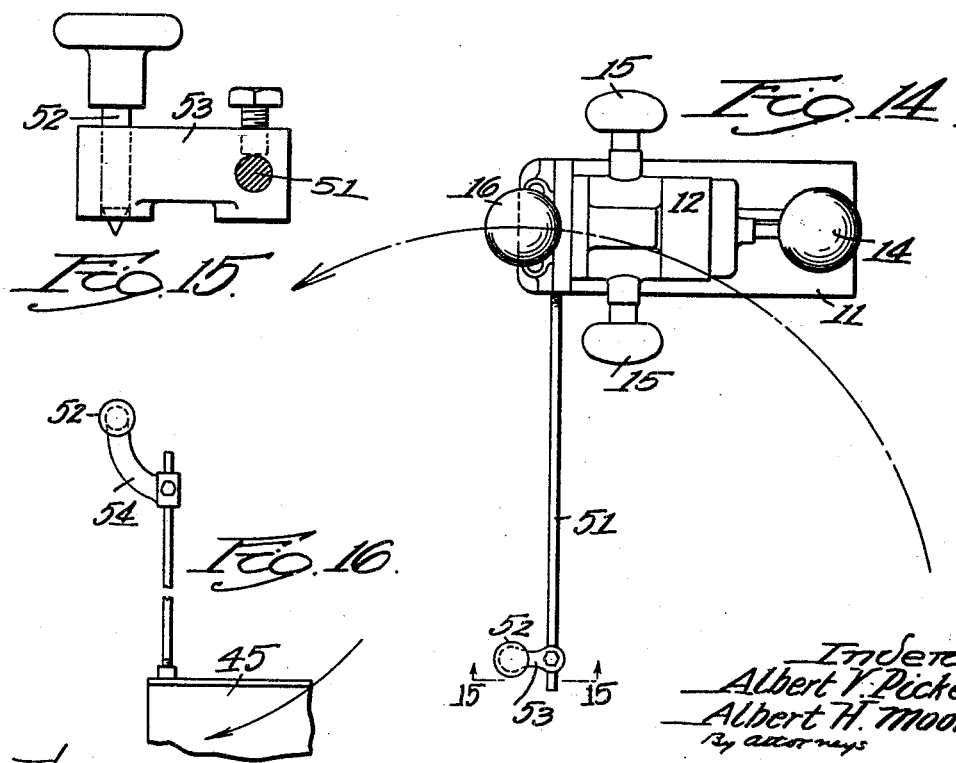

Patented Oct. 6, 1931

1,826,188

UNITED STATES PATENT OFFICE

ALBERT V. PICKERING AND ALBERT H. MOORE, OF FITCHBURG, MASSACHUSETTS, ASSIGNORS TO PORTABLE ELECTRIC TOOL CORPORATION, OF FITCHBURG, MASSACHUSETTS, A CORPORATION OF MASSACHUSETTS

JIG SAW

Application filed May 31, 1930. Serial No. 457,872.

The principal objects of this invention are to provide a motor-operated jig saw, adapted to cut wood, fiber, metal and other materials, with a simple and convenient operating means; to provide convenient means for manipulating the saw; to provide spring-pressed plungers for holding the bottom of the tool above the surface to be operated on temporarily to keep the jig saw out of contact with the work; to provide an effective and convenient latch for the same; to provide convenient means for holding the jig saw at an inclination sideways so as to saw a bevel; to provide means for holding the saw in cutting position at an inclination longitudinally; to provide means by which the saw can be guided effectively to saw an arc the radius of which is adjustable; to provide means for cutting circles with the bevel cutting attachment applied also and in general to provide a compact tool for this purpose of comparatively inexpensive construction.

Other objects and advantages of the invention will appear hereinafter.

Reference is to be had to the accompanying drawings in which

Fig. 3 is a view of the front end of the tool;

Fig. 4 is a vertical sectional view on the line 4—4 of Fig. 3;

Fig. 5 is a side view showing the frame lifted up at the front end to keep the saw out of contact with the work;

Fig. 6 is a plan of the guide roller as indicated by the arrow 6 in Fig. 3;

Fig. 7 is a transverse sectional view on the line 7—7 of Fig. 5;

Fig. 8 is a side view of the saw and its supporting and operating mechanism showing the surrounding parts in section;

Fig. 9 is an elevation of the front end of the saw-operating elements taken at the point indicated by the arrow 9 in Fig. 8;

Fig. 10 is an elevation of the rear surface of a removable plate in which the saw is guided, showing the parts in section, the arrow 10 in Fig. 2 showing the position from which this elevation is taken;

Fig. 11 is a horizontal sectional view on the line 11—11 of Fig. 10;

Fig. 12 is a front end elevation showing the instrument employed with a support constituting a beveling attachment;

Fig. 13 is a view similar to Fig. 5 but showing an attachment for holding the frame in inclined position and guiding the saw at a point beyond the area of the base of the frame;

Fig. 14 is a plan showing a circle or arc making attachment;

Fig. 15 is a sectional view of the same on the line 15—15 of Fig. 14 showing the center point, and Fig. 16 is a plan of an attachment used for cutting a circle with the bevel cutting attachment in position.

Figure 1:
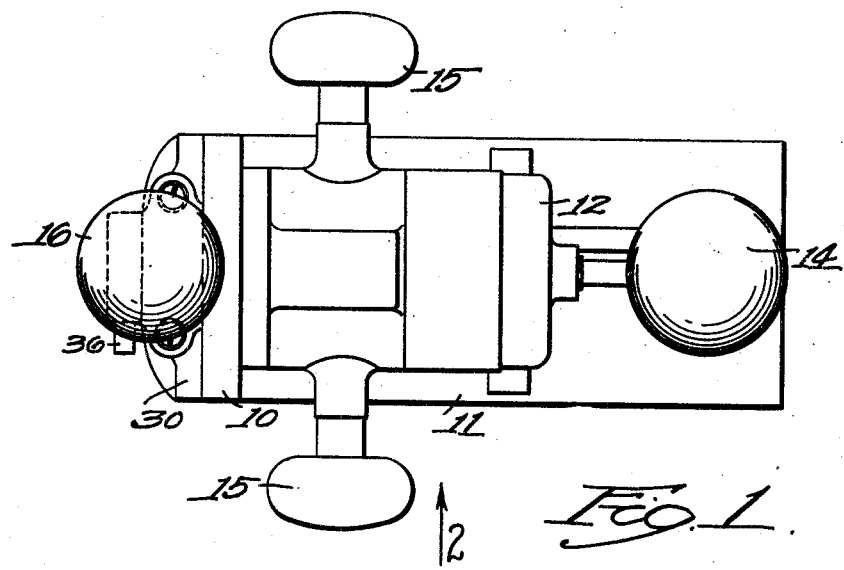
Fig. 1 is a plan of a jig saw constructed in accordance with this invention.
Figure 2:
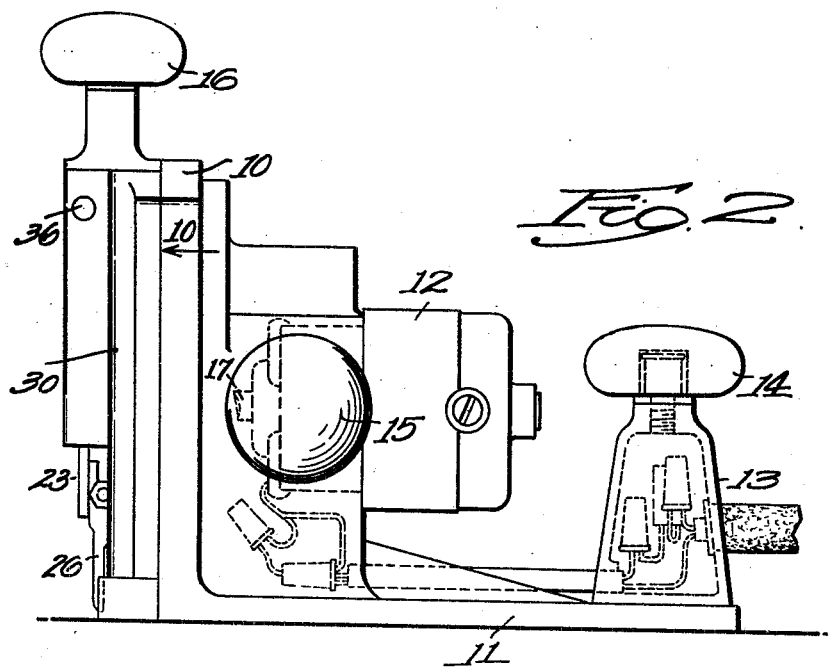
Fig. 2 is a side elevation as indicated by the arrow 2 in Fig. 1.

This invention is shown in a form comprising a frame 10 having a flat bottom or base 11. On the frame is mounted a motor 12 and at the rear of the base is a hollow standard 13 in which are located electric switches and other connections and which is provided with a knob 14 constituting a handle for use in manipulating the machine. This is used by itself much of the time but two opposite handles 15 on the frame are also used as will appear. Also there is a front handle 16. All these handles are shown as in the form of knobs and the two handles 14 and 16 are readily rotatable but the other two handles are fixed.

The shaft 17 of the motor is provided with a pinion 18 meshing with a gear 19 rotatable on a parallel axis and having an eccentric stud 20 for driving the tool. This gear also has at the rear of it fan blades 21 for helping to keep the interior parts cool. The pin 20 passes into a link 22 which is freely pivoted on a vertical cutter slide 23. Thus the rotation of the gear 19 reciprocates this cutter slide. The cutter slide is held against motion in any except straight vertical direction by two grooved rolls 24, each operating in a vertical slot in the slide and each mounted on a stationary stud, the roll of course being free to rotate. The inner edges of the slots fit in the circumferential grooves in the rolls to keep the slide in proper alignment.

On the bottom the cutter slide is provided with a longitudinal vertical recess in which fits the shank of a cutting tool or saw 26. This tool is held in position by a screw and washer and, on account of the shape of the recess in which it is located and the fact that the shank of the tool fits it, one screw holds it firmly in position. The cutter is provided with a slot 27 at its upper end so that it can be adjusted relative to the tool slide. This cutter is the jig saw proper of the machine. Preferably it is provided with a sharp end. It will be understood that different kinds of cutters can be arranged for different kinds of work. The teeth are so arranged that they cut on the upward stroke in the form shown.

The gears 18 and 19 are mounted on shafts carried by the frame 10 in a vertical part thereof which is hollowed out to provide for receiving them. Fitting on the front of the open or front side of this frame is a plate 30 adapted to be screwed to the open side of the frame. This plate supports the knob or handle 16 on the top and it also carries the cutter slide by means of the rolls 24 which are carried by this plate. Of course, it has an opening through a bottom surface through which the cutter slide reciprocates.

The plate 30 is provided with two vertical bores or cylindrical recesses therein in which are located spring-pressed plungers 31. Each of these has a foot 32 normally resting in a recess 33 in the frame 10, which recess 33 is located directly under these bores and concentric therewith. These plungers are adapted to come down under the bottom 11 as shown in Fig. 5 to hold the bottom up off the work or table and the springs normally force the plungers down into that position.

These plungers can be forced up by hand and held by a latch 34. This latch is in the form of a bar located in a recess across the inner surface of the plate 30 and held in that recess by springs 35. A plunger 36 operated by hand and having a circumferential recess 37 is used to operate it. On the latch 34 is fixed a rod 38. When the plunger is in the position shown in Fig. 11 the springs pull the latch back as shown in that figure. If the plunger is now pushed in by hand far enough the latch will snap over a groove near the top of each and hold the plungers up in opposition to the spring pressure. Obviously the latch can be released from both plungers by pushing in the plunger 36 until a full-sized portion of it engages the pin 38 and forces it out.

On the frame 10 is located another guide roll 29 in position to guide and steady the rear side of the saw. This guide roll is mounted in a removable slide 28 adapted to be secured in position by screws as shown in Fig. 7.

In Fig. 13 a modification is shown in which, instead of placing a cutter directly on the bottom of the cutter slide, an offset arm 40 is mounted on it in the same manner as the cutter and this arm has a slot 41 in which the cutter itself is mounted the same way as previously described. This brings the cutter in a position offset from the slide but still parallel with it. When used in this way a slide 42 having a guide roll 43 used in place of the slide 28. This guide roll 43 then projects down below the bottom of the frame and beyond the end of it so as to come into position for guiding the cutter. This situation is shown in Fig. 13 and constitutes a means by which the whole device can be held inclined in a longitudinal position and the cutter made to cut on a slant.

In Fig. 12 the device shown in the first eleven figures is shown with the frame mounted on a bevel attachment 45. This consists of a false bottom having a pair of angular rests 46 at one edge and a pair of rests 47 at the other on which the opposite edges of the bottom 11 can be supported. In this case an angle rod 48 is inserted in a perforation in the side of the frame and secured by a nut 49 to a perforated projection 50 on the upper side of the frame. This holds the machine in this position and the saw obviously will cut on a bevel.

In Fig. 14 a use of the device is shown in which it is arranged to cut a circle or an arc of a circle. In this case an adjustable radius rod 51 is screwed into a threaded hole in the side of the frame and a center point 52 having a conical or sharpened end is adapted to be forced into the wood or other material on which the work is being done. This center point is carried by a bracket 53 which is secured in any adjusted position along the radius rod 51. The operator holds this center point down by pressure on the head thereof and moves the whole machine around it as a center to cut an arc as indicated in Fig. 14.

When it is desired to cut a circle or arc with the bevel cutting attachment in position so that both of these results are secured, the pivot pin 52 is applied through a passage in a curved arm 54 which is adjustably mounted on the radius rod 51 in the manner above mentioned. This radius rod is then secured in a hole in the bevel attachment 45. In this way a bevel cut can be made on a circle. The regular pivot bracket 53 could not be used in this case because the cutter has to be placed further ahead when applied to the bevel attachment and the pivot bracket provides an offset to keep the point of the knife in proper relation to describe a circle about a center.

Referring back to the first eleven figures it may be stated that this device can be used to cut wood, fiberboard, metal or the like. In starting, the cutter should be set at the bottom of the stroke with the point extending slightly below the bottom surface of the tool. The motor is started and the machine is operated quite generally by the rear handle 14 only. With a little practice the machine can be manipulated by this handle to follow the lines on which the cut is to be made without touching the front handle at all. On wall boards, thicker than one quarter of an inch, it is usually necessary to put a slight pressure on the front handle. When making short strokes especially for intricate work where the cutter has to be lifted out from one cut to cut into the next one, the spring plungers are lifted. The two side handles are directed with the right and left hand with the cutter facing the operator. When a short cut is finished and it is time to raise the frame, the spring plungers will assist in that operation. It is desirable to start the cut in the softer woods with the plungers down so that the machine has to be held down on the surface. The latch, however, is set so that when the machine is fully pressed down the latch will automatically hold the plungers out of the way in order to continue the cut. The circle cutting attachment has been explained and also the beveling.

Thin metals can be cut with this machine but, of course, a cutter has to be used which is hardened for that purpose and should be set so that it will just break through the metal.

This constitutes a very convenient and easily manipulated machine for these various purposes. The mechanism is not complicated and the manipulation is natural and simple. A number of uses to which the machine can be put have been described and shown in the drawings.

Although we have shown and described the main parts of the invention in only a single form and illustrated only a few modifications and attachments therefor we are aware of the fact that other modifications can be made and the machine used in other ways without departing from the scope of the invention as expressed in the claims. Therefore, we do not wish to be limited in this respect but what we do claim is:—

1. In a jig saw, the combination with a base, a motor mounted on the base, and means for operating a saw from the motor, of a pair of headed plungers reciprocably mounted on the frame in vertical position, springs for normally lowering the plungers and raising the base relative to the work to keep the saw out of contact with the work, a spring latch for holding the plungers in retracted position where they do not project through the bottom of the base, and a hand operated member for applying and releasing the latch.

2. In a jig saw, the combination with a base having a flat supporting surface so that it can be moved at will over a flat surface, of a reciprocable slide thereon for supporting a saw, and a bevel attachment having means for supporting said base in an inclined position.

3. In a jig saw, the combination with a base having a flat supporting surface so that it can be moved at will over a flat surface, of a reciprocable slide, a saw fixed on said slide and adapted to cut at right angles to the flat supporting surface, a bevel attachment having means for supporting said base in an inclined position, and a center point attached to the bevel attachment by which the saw can be caused to cut a bevel arc.

In testimony whereof we have hereunto affixed our signatures.

ALBERT V. PICKERING.
ALBERT H. MOORE.